United States Patent [19]
Jetter et al.

[11] Patent Number: 5,107,373
[45] Date of Patent: Apr. 21, 1992

[54] ARRANGEMENT FOR TURNING IMAGE PROJECTED ON IMAGE SCREEN

[75] Inventors: Rainer Jetter, Munich; Eckhard Schafferus, Puchheim, both of Fed. Rep. of Germany

[73] Assignee: AGFA-Gevaert A G, Leverkusen, Fed. Rep. of Germany

[21] Appl. No.: 615,799

[22] Filed: Nov. 16, 1990

[30]   Foreign Application Priority Data

Dec. 21, 1989 [DE] Fed. Rep. of Germany ....... 3942415

[51] Int. Cl.$^5$ .......................... G02B 7/18; G02B 5/04; G02B 5/22
[52] U.S. Cl. .................... 359/833; 359/726; 359/737; 359/738; 359/888; 353/81
[58] Field of Search ............... 350/445, 447, 448, 286, 350/287, 314, 6.4; 353/81

[56]   References Cited

U.S. PATENT DOCUMENTS 4,529,276  7/1985  Yamada ........................... 350/445

Primary Examiner—Jon W. Henry
Attorney, Agent, or Firm—Michael J. Striker

[57]   ABSTRACT

An arrangement for turning an image projected on an image screen has an image screen, a trapezoidal prism for image turning, and an optical system for image producing. The prism has an entry surface, a base surface and an exit surface. The entry surface of the prism encloses with the base surface an angle which is different from an angle enclosed by the exit surface of the base surface. A light beam extending on an optical axis of the optical system for image producing is offset on the exit surface relative to the optical axis and encloses an angle with the optical axis which is not equal to zero, and a transmission filter is located between the prism and the image screen.

13 Claims, 6 Drawing Sheets

ARRANGEMENT FOR TURNING IMAGE PROJECTED ON IMAGE SCREEN

BACKGROUND OF THE INVENTION

The present invention relates to arrangement for turning an image projected on an image screen, by means of a trapezoidal prism for image turning and an optical system for image producing.

Arrangements of the above mentioned general type are known in the art. One of such arrangements is disclosed for example in U.S. Pat. No. 4,529,276. This arrangement includes an optical system for image for producing and a trapezoidal prism for image turning. A light shield is arranged between the image producing system and the image turning prism which later on will be referred to as prism. The main object of the arrangement in accordance with U.S. Pat. No. 4,529,276 is to reduce the prism without changing the light density distribution of the projected image. For solving this object in this patent the prism is simply shortened. Therefore due to the vignetting of the exit aperture of the projected optical system, the non-uniform distribution of the light density of the projected image exiting the prism is compensated by the light shield. The thusly produced reducing of the prism which directly does not vignet the exit aperture of the image producing system amounts to approximately 50% in volume and approximately 25% in the light path. Since the type of glass suitable for producing of the prism is very expensive and the aberrations of the prism such as for example astigmatism, distortion and color tranverse error are proportional to the light path, there is a requirement due to the high quality requirements with simultaneous cost reduction that the prism be made as small as possible.

SUMMARY OF THE INVENTION

Accordingly, it is an object of the present invention to provide an arrangement for turning an image projected on an image screen by means of a trapezoidal prism or image turning in an optical system for image producing, which is formed so that with smallest possible, cost minimal prism volume, a reduction of aberrations and uniform light density distribution in the image plane is achieved and during turning of the image no image movement occurs.

In keeping with the objects and with others which will become apparent hereinafter, one feature of the present invention resides, briefly stated, in an arrangement of the above mentioned general type in which an exit surface of the prism encloses an angle with base surface of the prism which is different from an angle enclosed between an exit surface of the prism and the base surface of the prism, a light beam extending on an optical axis of the optical system is offset on an exit surface relative to the optical axis and encloses with the optical axis an angle which is not equal to zero, and a transmission filter is arranged between the prism and the image screen.

When the arrangement is designed in accordance with the present invention it eliminates the disadvantages of the prior art and provides for the above specified advantages.

Due to combination of the asymmetrical prism, displacement and tilting of the optical axis and the arrangement of a transmission filter betweeen the image screen and the pfism is possible:

1. To reduce the prism volume by approximately 60% relative to the prism used in U.S. Pat. No. 4,529,276 so as to shorten the light path by approximately 33%;
2. To displace the prism back to the opening plane of the projecting optical system since no light shield is arranged between them; and
3. To exactly perform any brightness compensation by means of the transmission filter.

A special advantage is achieved by the asymmetry of the prism, which not only contributes to the reduction of the prism volume and compensates the offset of the optical axis of the image producing optical system, but also is used for compensation of the projection errors.

Thereby the invention provides for the price favorable construction for turning of an image projected on an image screen with low structural size and high projecting quality.

The novel features which are considered as characteristic for the invnetion are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
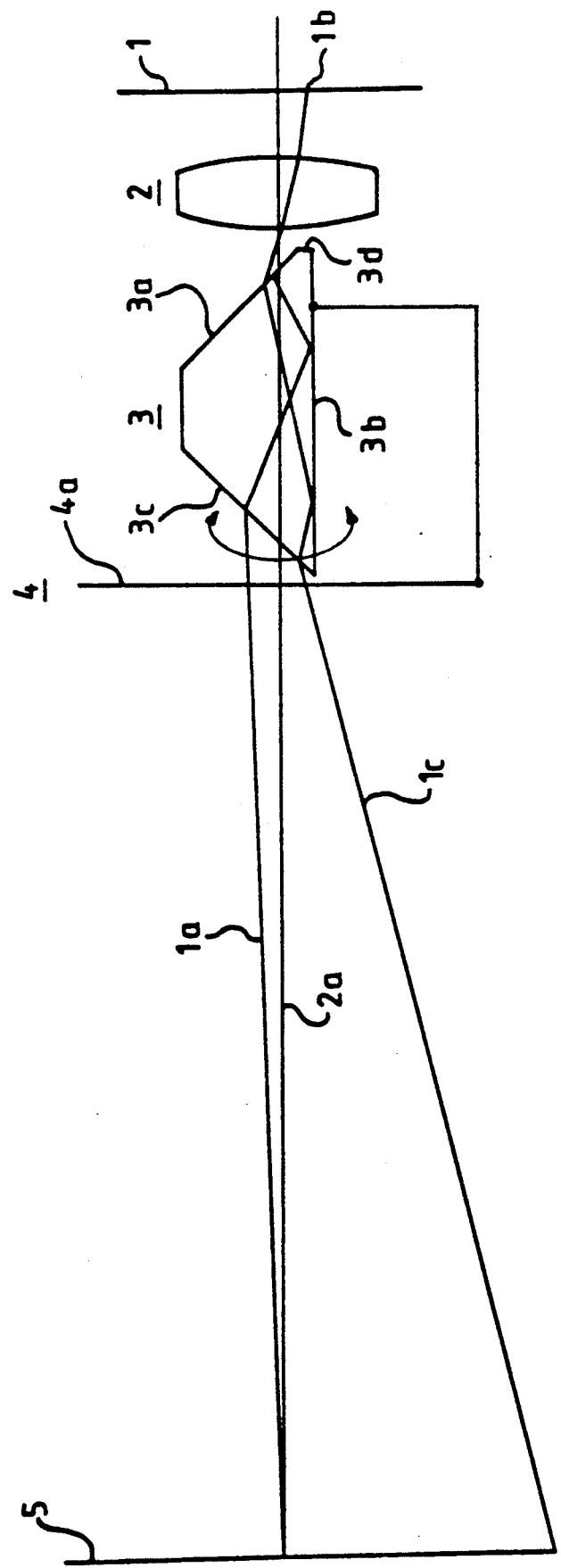
FIG. 1 is a schematic view of an arrangement for turning of an image projected on an image screen, with a trapezoidal prism for image turning and an optical system for image producing.

FIG. 1 shows in principle a construction of an arrangement for image turning with an object plane 1, an optical system 2 for producing an image referred hereinbelow as image producing system 2, a trapezoidal prism 3 for turning an image referred to hereinbelow as a prism 3 or an image turning element 3, an image screen 5 and a transmission filter 4 arranged between the image screen 5 and the prism 3. An optical axis of the image producing system 2 is identified with reference numeral 2a. The prism 3 and the transmission filter 4 are arranged in a fixed position relative to one another and together turnably about the optical axis 2a.

A light beam extending along the optical axis 2a is identified with reference numeral 1a. After passing the prism 3 it is offset relative to the optical axis 2a and inclined to the same.

An object point in the object plane 1 which lies not on the optical axis 2a is identified with reference numeral 1b. A light beam from the object point 1b to the image screen 5 is identified with reference numeral 1c. An entry surface of the prism 3 is identified with reference 3a, a base surface with 3b and an exit surface with 3c. An edge formed by the entry surface 3a and the base surface 3b extending perpendicular to the optical axis 2a is flattened and identified with reference numeral 3d.

Figure 2:
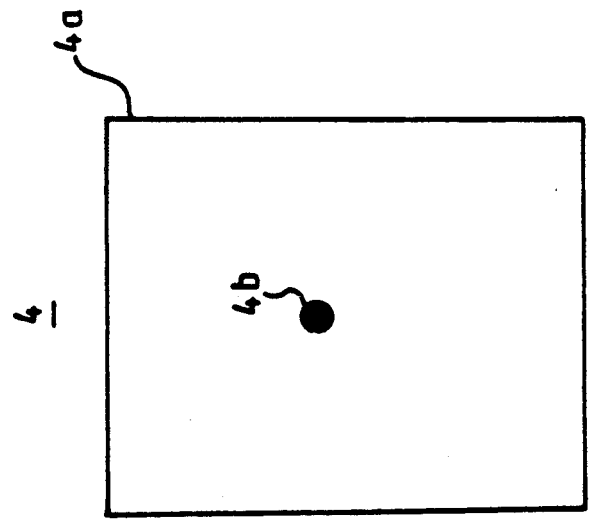
FIG. 2 is a view showing an embodiment of a transmission filter used in the arrangement for image turning.

FIG. 2 shows for example the transmission filter 4 which is composed of a planparallel glass plate 4a and has a point 4b of maximun blackening at the location at which the light beam 1a strikes. Instead of one parallel glass plate 4a, also a transparent foil can be used, which is held by a not shown foil holder.

Figure 3:
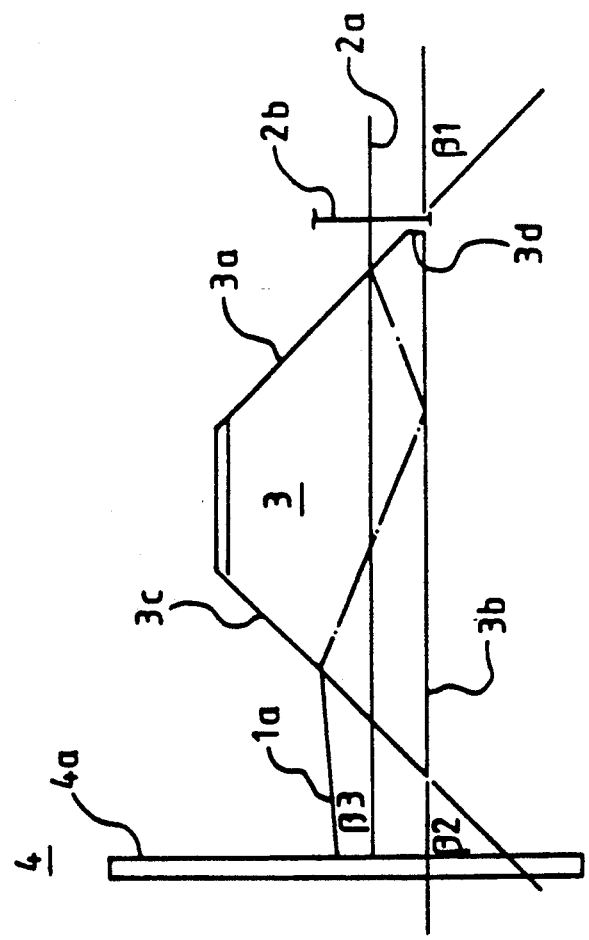
FIG. 3 is an increased schematic view of the invention arrangement for image turning without an image screen.

FIG. 3 shows an enlarged arrangement for image turning without the image screen 5, wherein an opening of the image producing system 2 is identified as 2b. An angle enclosed by the entry surface 3a with the base surface 3b is identified as $\beta_1$. An angle which is enclosed by the exit surface 3c with the base surface 3b is identified as $\beta_2$. An angle between the light beam 1a and the optical axis 2a is designated as $\beta_3$.

Figure 4:
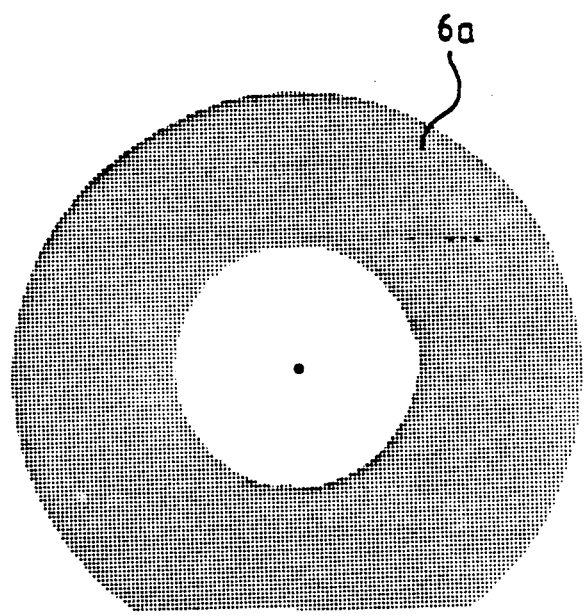
FIG. 4 is an exit aperture of the arrangement for image turning as seen from the image screen under an image angle of 0°.

The transmission filter is shown in FIGS. 2-4. It can be formed as a planparallel glass plate 4a or a tightened foil.

Figure 5:
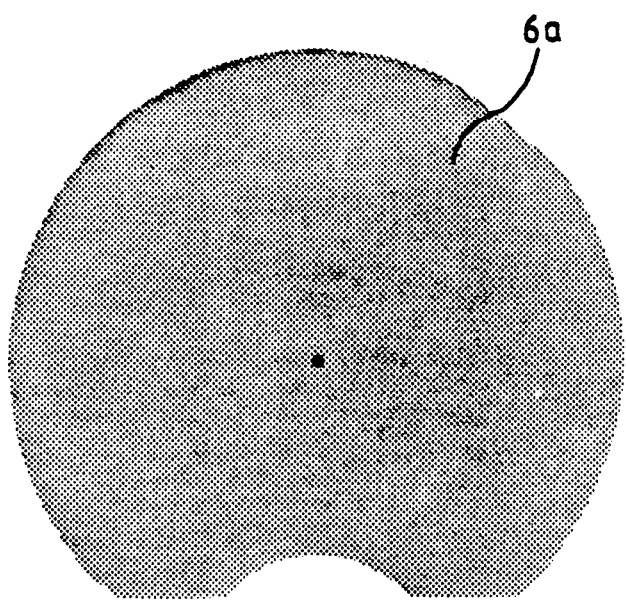
FIG. 5 is an exit aperture of the arrangement for image turning as seen from the image screen under an image angle of 9°.
Figure 6:
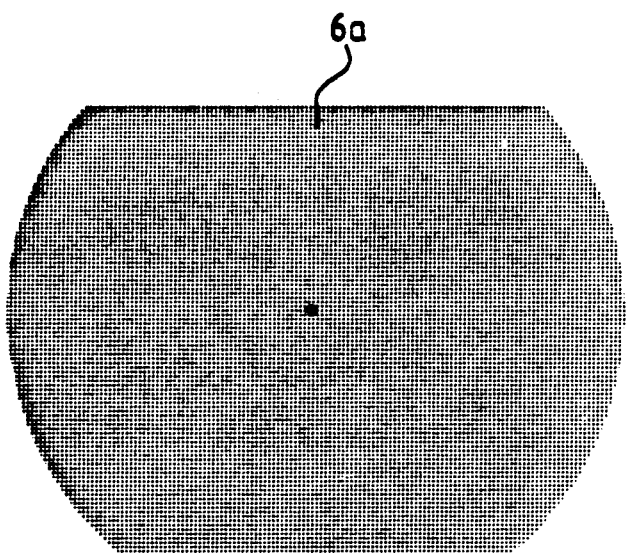
FIG. 6 is an exit aperture of the arrangement for image turning as seen from the image screen under an image angle of 15°.
Figure 7:
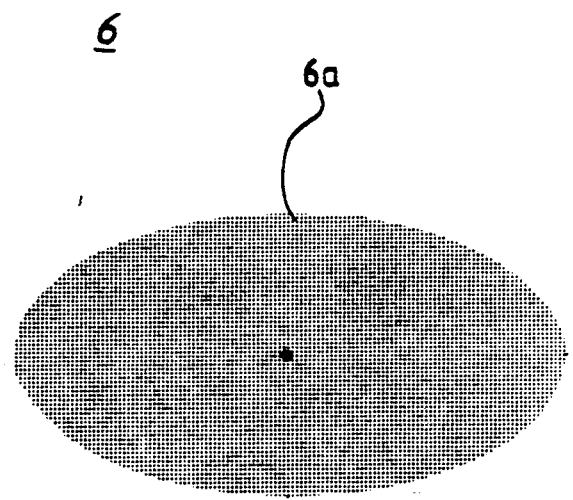
FIG. 7 is a view substantially corresponding to the view of FIG. 6, but showing an exit aperture when the arrangement has a filter with an elliptical area.

FIG. 4-7 show an outlet aperture 6 of the arrangement for turning the image with different image angles as seen from the image screen 5. A surface which is permeable for light from an object in the object plane 1 is identified with 6a. The image angle in FIG. 4 is 4°, in FIG. 5 is 9°, and in FIGS. 6 and 7 is 15°. FIG. 7 is a view substantially corresponding to the view of FIG. 6, but showing an exit aperture when the arrangement has a filter with an elliptical area.

The operation of the arrangement for turning of an image in FIGS. 1-7 is as follows:

The light beam 1c from the object point 1b of the object plane 1 is deviated by the image producing system 2 so that an inverse image of the object point 1b is produced on the image screen 5. On its way from the image producing system 2 to the image screen 5 the light beam 1c passes through the prism 3. It is refracted on the entry surface 3a and the exit surface 3c and totally reflected on the base surface 3b. Due to the total reflection on the base surface 3b the image is inverted. In other words, the object point, for example, 1b, lying underneath the optical axis 2a is projected by the image producing system and the prism 3 in an image point located underneath the optical axis 2a. This corresponds to a turning to the image by 180° relative to an arrangement without the prism 3 for the image turning.

When the prism 3 and the transmission filter 4, as is the inventive arrangement for image turning, is turnable jointly about an optical axis 2a, the image is turned along during the rotation of the prism 3 and the transmission filter 4 about the optical axis 2a. Therefore during a turning of the prism 3 about 180° the image is turned by 360°.

Starting from a symmetrical, trapezoidal prism which does not directly intersect an exit aperture of the image producing optical system 2 and has a volume, measured in the inventive arrangement, which is greater by the factor 5, and the light way by the factor 2, the inventive arrangement for image turning is obtained in five steps:

1. Shortening of the prism 3 in direction of the optical axis 2a. This feature leads with addition ot the light shield to the arrangement in accordance with U.S. Pat. No. 4,529,276. In this patent the brightness compensation by a light shield is performed between the prism 3 and the image producing system 2.
2. Displacement of the base surface 3b in direction to the optical axis 2a. Thereby the vignetting produced in the first step is counteracted, whereby the prism can be further shortened. Image center and turning point no longer coincide with one another so that during turning the image travels.
3. Flattening of the edge formed by the entry surface 3a and the base surface 3b so that the thusly produced edge 3b can be displaced to the opening 2b. This feature leads to the fact that the light beams which extend not parallel to the optical axis 2a, such as for example the light beam 1c strike the base surface 3b in the region of the base surface 3b which lies near on the edge 3d. Thereby a further shortening of the prism is possible
4. Tilting of the entry surface 3a and the exit surface 3c so that the angle $\beta_1$ is not equal to the angle $\beta_2$. With this feature the displacement of the optical axis 2a in the second step is compensated. This means that the light beam 1a strikes the image screen 5 in the point in which the optical axis 2a intersects the image screen 5. Thereby the image during turning no longer travels. In addition, the image field is compensated by the proper selection of the angles $\beta_1$ and $\beta_2$.
5. Arrangement of a transmission filter 4 directly after the prism 3 between the prism and the image screen 5, which compensates the brightness reduction.

In this case of a transmission filter 4 from FIG. 2, the point 4b of the maximum blackening acts so that the surface 6a of the exit aperture 6 as seen from the image screen 5 remains approximately identical with different image angles. Thereby an approximately uniform light density distribution over the projected image is achieved.

In addition to the above described design of the transmission filter 4 further possibilities are provided:

a) Instead of a point of maximum blackening, a point with predetermined gray value and a surface greater than the surface of the point in FIG. 2 on the planparallel glass plate 4a are brought.

(b) The planparallel glass plate 4a can be evaporated with a continuous density profile, so that an exact uniform brightness distribution on the image screen 5 is obtainable.

c) The planparallel glass plate 4a can be replaced by a tightened foil which has a density course required for brightness compensation.

d) The point of maximum blackening 4b or the point with the predetermined gray value from the possibility a) of the described arrangement or the continuous density profile can be brought direcrly on the exit surface 3c of the prism 3.

During the determination of the geometric parameter of the steps 1-4 and the transmission filter 4 of the fifth step, the inventive arrangement is suitable for the image turning to provide higher projecting quality relative to the prior art with reduced structural size.

It will be understood that each of the elements described above, or two or more together, may also find a useful application in other types of constructions differing from the types described above.

While the invention has been illustrated and described as embodied in an arrangement for turning an image projected on an image screen, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for turning an image projected on an image screen, comprising an image screen; a trapezoidal prism for image turning; and an optical system for image producing, said prism having an entry surface, a base surface and an exit surface, said entry surface of said prism enclosing with said base surface an angle which is different from an angle enclosed by said exit surface of said base surface, a light beam extending on an optical axis of said optical system for image producing being offset on said exit surface relative to the optical axis and enclosing an angle with the optical axis which is not equal to zero; and a transmission filter located between said prism and said image screen.

2. An arrangement as defined in claim 1, wherein said prism and said transmission filter are arranged relative to one another in a fixed relative position and jointly turnable about the optical axis of the optical system for image producing.

3. An arrangement as defined in claim 2, wherein said prism has an edge facing toward the optical system for image producing and formed by said entry surface and said base surface, said edge being flattened perpendicularly to the optical axis of the optical system.

4. An arragement as defined in claim 3, wherein said optical system for image producing has an opening, said edge extending into said opening, of said optical system edge extending into said opening of said optical system.

5. An arrangement as defined in claim 1, wherein said transmission filter is formed as a support of a planparallel glass plate arranged perpendicularly to said optical axis of said optical system.

6. An arrangement as defined in claim 1, wherein said transmission filter is formed as a tightened transparent foil arranged perpendiculary to said optical axis of said optical system.

7. An arrangement as defined in claim 1, wherein said tramsmission filter is arranged directly on said exit surface of said prism.

8. An arrangement as defined in claim 1, wherein said transmission filter has a density distribution which extends over an exit aperture of said optical system as considered from said image screen and has a density course exactly compensating a brightness distribution.

9. An arrangement as defined in claim 1, wherein a relative position of said prism to said optical system and said angles between said entry surface and said base surface and between said exit surface of said base surface of said prism are selected so that a light beam extending along said optical axis of said optical system has an offset relative to said axis and leaves said exit surface with an angle relative to said optical axis that said beam strikes said image screen in a point in which said optical axis of said optical system intersects a plane of said image screen.

10. An arrangement as defined in claim 1, wherein said transmission filter has a circular area with constant transmission $<1$ and lies in a light path of a light beam which during exiting from said optical system extends on said optical axis, said area of said transmission filter is formed so as to compensate a brightness decrease in an image plane.

11. An arrangement as defined in claim 1, wherein said transmission filter has an elliptical area with constant trannsmission $<1$ and lies in a light path of a light beam which during exiting from said optical system extends on said optical axis, said area of said transmission filter is formed so as to compensate a brightness decrease in an image plane.

12. An arrangement as defined in claim 1, wherein said transmission filter has a circular area with transmission $<1$ and lies in a light path of a light beam which during exiting from said optical system extends on said optical axis, said area of said transmission filter and the distribution of the transmission within that area are formed so as to compensate a brightness decrease in an image plane.

13. An arrangement as defined in claim 1, wherein said transmission filter has an elliptical area with transmission $<1$ and lies in a light path of a light beam which during exiting from said optical system extends on said optical axis, said area of said transmission filter and the distribution of the transmission within that area are formed so as to compensate a brightness decrease in an image plane.

* * * * *